United States Patent [19]

Cok

[11] Patent Number: 6,097,837
[45] Date of Patent: Aug. 1, 2000

[54] METHOD AND APPARATUS FOR REMOVING TEMPORAL LIGHTING VARIATIONS FROM AN IMAGE SOURCE

[75] Inventor: David R. Cok, Rochester, N.Y.

[73] Assignee: Eastman Kodak Company, Rochester, N.Y.

[21] Appl. No.: 09/038,681

[22] Filed: Mar. 9, 1998

[51] Int. Cl.$^7$ .................................................. G06K 9/00
[52] U.S. Cl. ............................................................ 382/167
[58] Field of Search ...................................... 382/167, 168

[56] References Cited

U.S. PATENT DOCUMENTS

| | | | |
|---|---|---|---|
| 3,969,717 | 7/1976 | Hatsukano et al. | 340/324 |
| 3,971,065 | 7/1976 | Bayer | 358/41 |
| 4,630,307 | 12/1986 | Cok | 382/25 |
| 4,642,678 | 2/1987 | Cok | 358/44 |
| 4,723,163 | 2/1988 | Skinner | 358/140 |
| 4,799,105 | 1/1989 | Mitchell et al. | 358/160 |
| 5,034,814 | 7/1991 | Watson . | |
| 5,182,643 | 1/1993 | Futscher . | |
| 5,237,402 | 8/1993 | Deshon | 358/520 |
| 5,296,941 | 3/1994 | Izawa et al. | 358/458 |
| 5,382,976 | 1/1995 | Hibbard | 348/273 |
| 5,388,168 | 2/1995 | Sakashita et al. | 382/54 |
| 5,398,121 | 3/1995 | Kowalewski | 358/504 |
| 5,631,701 | 5/1997 | Miyake | 348/222 |

*Primary Examiner*—Leo H. Boudreau
*Assistant Examiner*—Paul H. Schirduan
*Attorney, Agent, or Firm*—David M. Woods

[57] ABSTRACT

A method and apparatus is provided for efficiently and automatically removing unwanted temporal lighting variations from image sequences. Specifically, temporal light variations from a sequence of images are removed by a process of selecting a reference image (R) and designating a portion of the reference image as a reference image region (M), designating a first portion of at least one base image (F) of the sequence of images as a first selected image region (M') and a second portion as a second selected image region (M"), generating a color mapping by comparing the selected image region of the base image (M') with the reference image region of the reference image frame (M), and applying the color mapping to the second selected image region (M") of the base image (F) to generated a corrected image (F'). Three separate methods of performing the color mapping are disclosed.

8 Claims, 4 Drawing Sheets

METHOD AND APPARATUS FOR REMOVING TEMPORAL LIGHTING VARIATIONS FROM AN IMAGE SOURCE

CROSS-REFERENCE TO RELATED APPLICATIONS

This application is related to co-pending and commonly assigned U.S. patent application Ser. No. 08/769,973 entitled "Method of Adjusting Image Pixel Values Within An Image Sequence by Interpolation of Target Cumulative Histograms for Images to be Adjusted", filed Dec. 19, 1996. Now U.S. Pat. No. 5,793,886, issued Aug. 11, 1998.

FIELD OF THE INVENTION

The invention relates in general to a method and apparatus for correcting for variations between images in a sequence. More specifically, the invention relates to a method and apparatus for removing temporal lighting variations from a motion picture image sequence.

BACKGROUND OF THE INVENTION

Motion picture image sequences are sometimes degraded by temporal lighting variations that occur within image frames of the motion picture image sequence. The temporal lighting variations, commonly referred to as "flicker", result from rapid changes in brightness of an entire image frame—or portion of an image frame—in an image frame sequence. Temporal lighting variations can result from a variety of sources including variations in lighting and/or exposure during the entire photographic process of filming and printing.

Flicker is recognized as an objectionable element that should be removed to enhance a viewer's experience when watching a motion picture. Unfortunately, flicker is difficult to manually remove during the editing process of a motion picture. It would therefore be advantageous and desirable to provide an automatic method and apparatus for removing temporal lighting variations from a motion picture that can be efficiently implemented.

In view of the above, it is an object of the invention to provide a method and apparatus for removing temporal lighting variations from image sequences in an efficient manner.

SUMMARY OF THE INVENTION

The invention provides a method and apparatus for efficiently and automatically removing unwanted temporal lighting variations from image sequences.

More specifically, temporal lighting variations from a sequence of images are removed by a process of selecting a reference image and designating a portion of the reference image as a reference image region, designating a first portion of at least one base image of the sequence of images as a first selected image region and a second portion as a second selected image region, generating a color mapping by comparing the selected image region of the base image with the reference image region of the reference image frame, and applying the color mapping to the second selected image region of the base image to generated a corrected image.

The reference image can be selected from the sequence of input images or from another source. Further, the reference image region can include the entire reference image.

The first selected image region is typically selected from a location of the base image region that substantially corresponds to the location of the reference image region in the reference image, although this is not required.

The color mapping can be accomplished through three preferred methods.

In a first method, generation of the color mapping includes determining the average numeric color value of the reference image region and the average numeric color value of the selected image region for each color band, generating a correction factor equal to the average numeric color value of the reference divided by the average numeric value of the selected image region if the numeric values are proportional to light intensity (linear metric), and generating a correction factor equal to the average numeric color value of the reference less the average numeric value of the selected image region if the numeric values are proportional to at least one of the density of the image and the log of the light intensity (logarithmic metric). Other metrics, may also be employed, and one of ordinary skill in the art can readily determine the mappings to take other metrics to linear, compute any change and then convert back to the desired metric.

The color mapping is applied by multiplying each pixel of the second selected image region with the correction factor if the numeric values are proportional to light intensity, and adding the correction factor to each pixel of the second selected image region if the numeric values are proportional to light intensity if the numeric values are proportional to at least one of the density of the image and the log of the light intensity.

A second method of generating the color mapping includes generating histograms for at least one color band for the pixels in the reference image region of the reference image and in the first selected image region of the base image, and generating a lookup table based on the histograms that maps original values of the pixels in the base image to corrected values in the corrected image.

A third method of generating the color mapping includes requiring that the color shift to be corrected be a simple density shift and that the regions being compared have the same shape and size.

These and other aspects, objects, features and advantages of the present invention will be more clearly understood and appreciated from a review of the following detailed description of the preferred embodiments of the invention, the accompanying drawings, and the appended claims.

BRIEF DESCRIPTION OF THE DRAWINGS

The invention will be described with reference to certain preferred embodiments thereof and the accompanying drawings, wherein.

DETAILED DESCRIPTION OF THE INVENTION

The invention will be described with reference to its use in removing flicker from motion picture image sequences. It will be understood, however, that the invention is not limited to the described application, and may be utilized to remove temporal light variations from any sequence of images generated from any type of imaging source including video.

Figure 1:
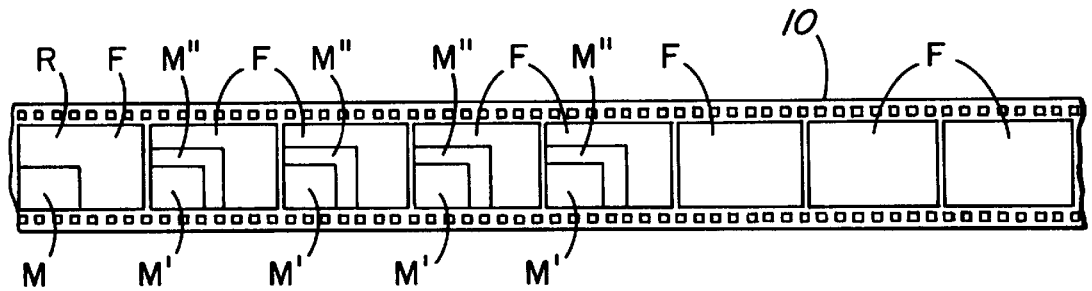
FIG. 1 illustrates a segment of a motion picture film have a plurality of image frames.
Figure 2:
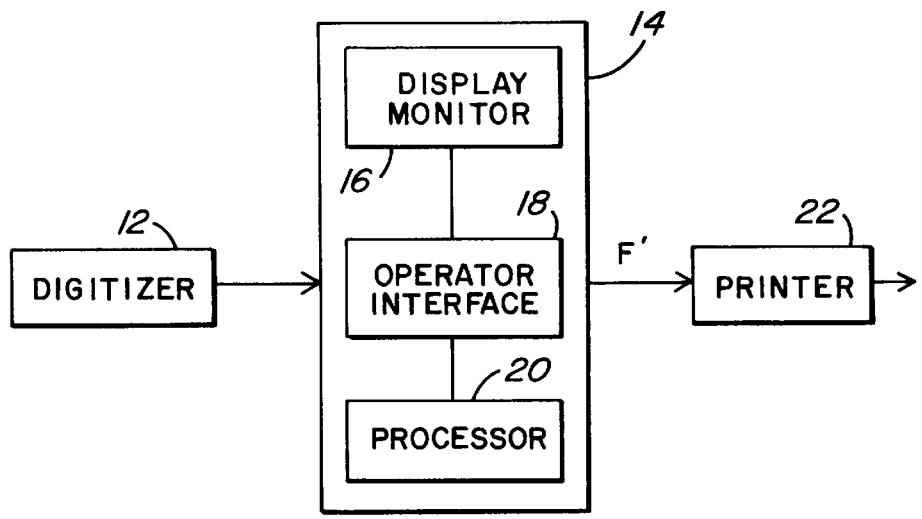
FIG. 2 illustrates an editing system in accordance with the present invention.

FIG. 1 illustrates a segment of motion picture film 10 including a sequence of base image frames (F) that correspond to a scene or a portion of a scene in a motion picture film sequence. In order to perform corrections to remove flicker, the segment of motion picture film 10 is scanned by a digitizer 12, shown in FIG. 2, which generates digital image data corresponding to each of the image frames (F). The digital image data, representing an input sequence of images with each image comprising a plurality of pixels, is supplied to an editing workstation 14 that includes a display monitor 16, an operator interface 18 and an image processing section 20. An operator working at the editing workstation 14 can display the image frames (F) on the display monitor 16 and perform various operations on the displayed image frames to generate corrected image frame data using the operator interface 18. In the illustrated embodiment, the corrected frame data representing a correct image frame (F') is supplied from the editing workstation 14 to a printer 22 which prints the corrected image frame (F') on photographic film to generate a corrected motion picture film segment.

In operation, the operator utilizes the operator interface 18 to select a reference image frame (R) and to designate a region of the reference image frame (R) as a reference image region (M). The reference image frame (R) is typically, but not necessarily, part of the input image sequence. The reference image region (M) may be the entire reference image frame (R) or may be chosen as just a portion of the reference image frame (R). Since motion within the reference image region (M) will complicate the removal of flicker, it is preferable to choose a region of the reference image frame (R) having no movement, for example a background area that does not contain moving foreground elements, for the reference image region (M).

Figure 3:
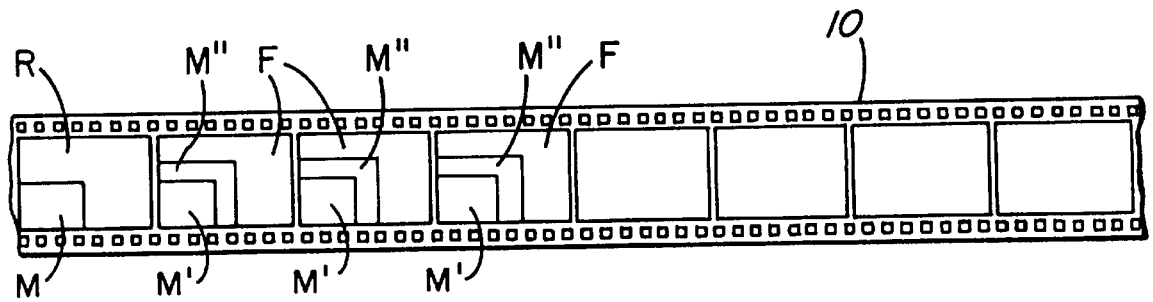
FIG. 3 illustrates the movement of a selected image region (M') during a sequence of frames.

For each frame (F) of an input image sequence, a selected image region (M') is chosen to use as a comparison to the reference image region (M). In a preferred embodiment, the location of the selected image region (M') in a given frame (F) corresponds to the location of the reference image region (M), as illustrated in FIG. 1, although such correspondence is not required. However, if an image component within the selected image region (M') is in motion, such as in the case of a pan across a background plate, it would be useful to have the selected image region (M') move in each subsequent image (F) as the image sequence progresses, as demonstrated in FIG. 3, so that the imagery within the selected image region (M') remains as constant as possible.

The selected image region (M') of the frame (F) is compared with the reference image region (M) of the reference image frame (R) to generate a color mapping by an image processing system of the editing workstation 14. A second selected image region (M") of the frame (F) is then chosen to which the color mapping (L) is applied to generated the corrected image frame (F') which is supplied to the printer 22. The second selected image region (M") is the region of the image frame (F) that includes the temporal light variations that need to be corrected. Again, the second selected image region (M") could be the whole image, could include the selected image region (M') or could correspond to some other area within the image frame (F). In a preferred embodiment, the second selected image region (M") does include at least the selected image region (M') since the region being corrected preferably should be measured in order to be corrected properly. As with the selected image region (M'), the second selected image region (M") moves in subsequent images as the image sequence progresses, if the flicker is localized and moves within the image.

The color mapping is preferably performed by the image processing system 20 of the editing workstation 12 using one of three methods that will be described in greater detail. It is also possible, however, to utilize a plurality of the methods within the image processing system 20 to optimize correction based on the characteristics of the temporal light variations exhibited in the input image sequence.

Figure 4:
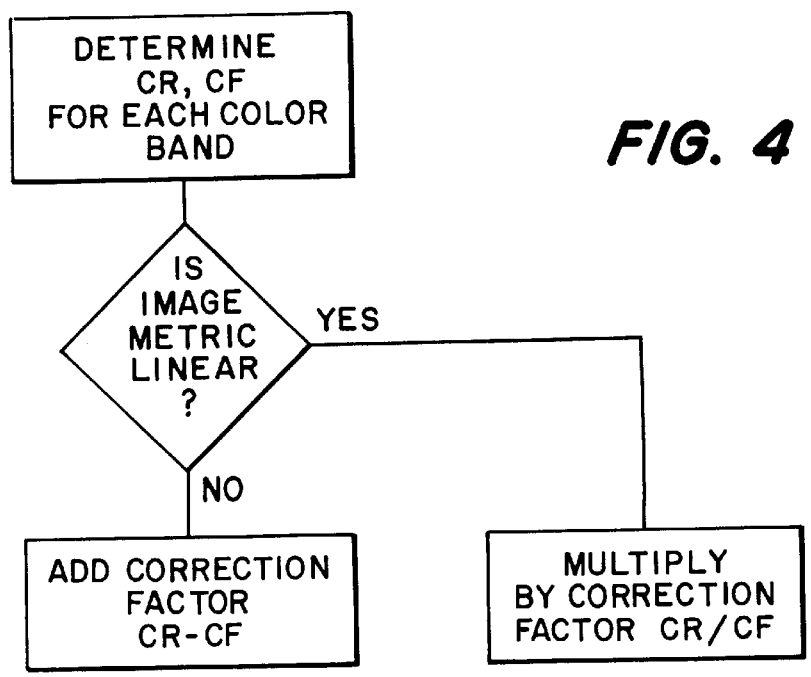
FIG. 4 is a flow diagram illustrating a first method of performing color mapping.

In a first method of performing the color mapping, the reference image region (M) and the selected image region (M') identify corresponding regions of the reference image frame (R) and the image frame (F) as described above. The average numeric color value (CR) of the reference image region (M) and the average numeric color value (CF) of the selected image region (M') are respectively determined for each color band (for example red, green and blue). If the image metric is a linear metric (the numeric values are proportional to light intensity), then each pixel value in the second selected image region (M") of the image frame (F) is corrected by multiplying it by the correction factor CR/CF to generate the corrected image frame (F'). If the image metric is a logarithmic metric (the numeric values are proportional to density of image or the log of light intensity), then each pixel value in the second selected image region (M") of the image frame (F) is corrected by adding the correction factor (CR−CF) to generate the corrected image frame (F'). This process is illustrated by the flow diagram provided in FIG. 4. It will be understood by those of skill in the art that other metrices, such as a gamma metric, may also be employed, and that one can readily determine the mappings to take other metrics to linear, compute any change and then convert back to the desired metric.

The above method has the advantage of simplicity and is applicable when there is a constant change in brightness over a region of the image. If objects are moving into or out of the reference region, however, the objects will cause incorrect estimates of the color shift to be generated.

Figure 5:
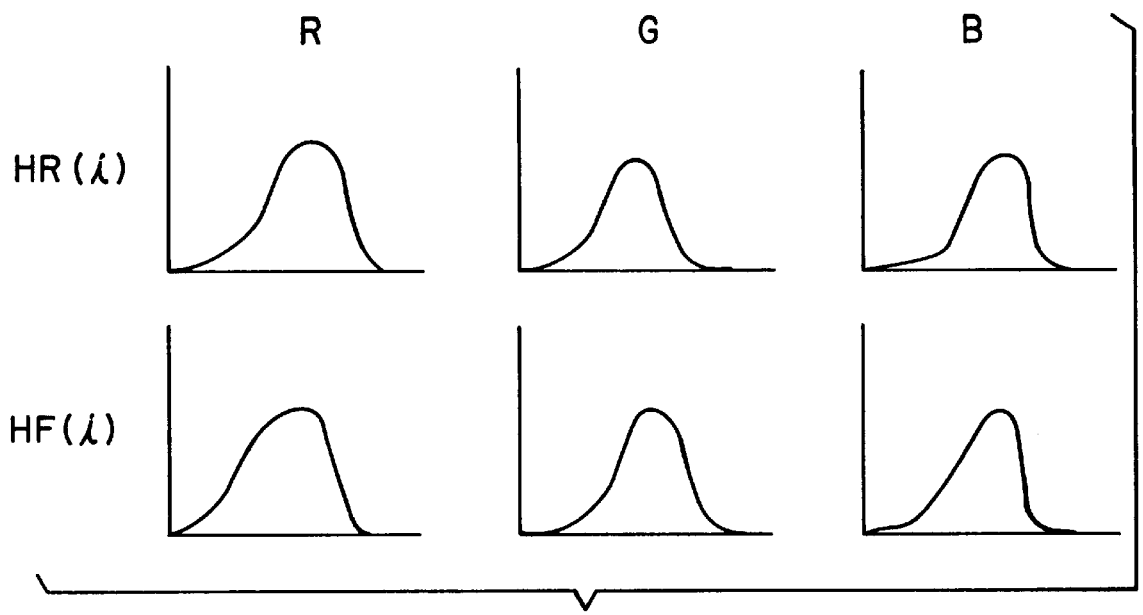
FIG. 5 is a diagram illustrating histograms generated from a reference image frame (R) and a base image frame (F)

A second method involves the generation of a look-up-table (LUT). In this method, histograms for each color band (red, green, blue), are separately computed for the pixels in the reference image region (M) of the reference image frame (R) and in the selected image region (M') of each image frame (F) as illustrated in FIG. 5. A LUT is then generated that maps original values of the pixels in the image frame (F) to corrected values as follows.

1. Let HR(i) and HF(i) be two normalized cumulative histograms, wherein the value of (i) ranges over the range of pixel values, respectively, in the reference image (R) and the image (F). The values of HR(i) are the number of pixels in the reference image region (M) whose value is less than or equal to (i) divided by the total number of pixels in the selected image region (M). A similar relationship holds for HF(i) with the selected image region (M').

2. Then:

Let minI be the smallest possible pixel value (typically 0).

Let maxI be the largest possible pixel value (typically 255 or 1023)

Let minR be the smallest value of i for which HR(i) is non-zero.

Let minF be the smallest value of i for which HF(i) is non-zero.

Let maxR be the smallest value of i for which HR(i) is 1.0.

Let maxF be the smallest value of i for which HF(i) is 1.0.

3. Define the following control points as:

LUT(minI)=minI

LUT(maxI)=maxI

LUT(minF)=min R

LUT(maxF)=max R

4. Choose a number of intermediate points N, such that for each k=1 to N, an additional control point is defined as follows:

Let r=k/(N+1)

Let jR be the value of i such that HR(i)<r£HR(i+1)

Let jF be the value of i such that HF(i)<r £HF(i+1)

LUT(jF)=jR

Figure 6:
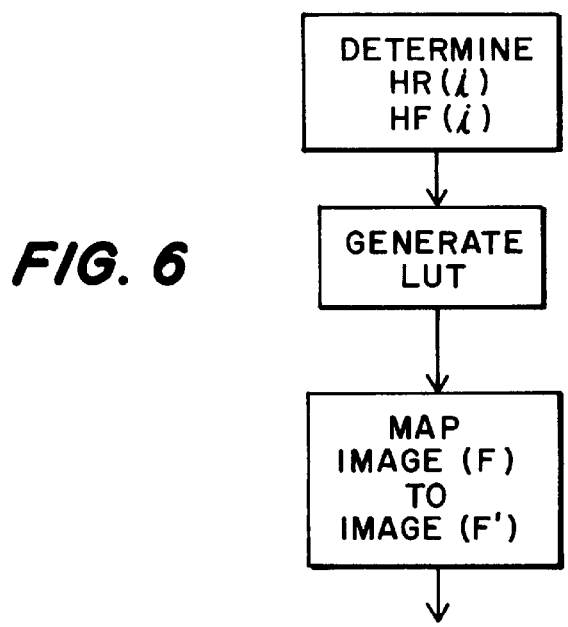
FIG. 6 is a flow diagram illustrating a second method of performing color mapping.
Figure 7:
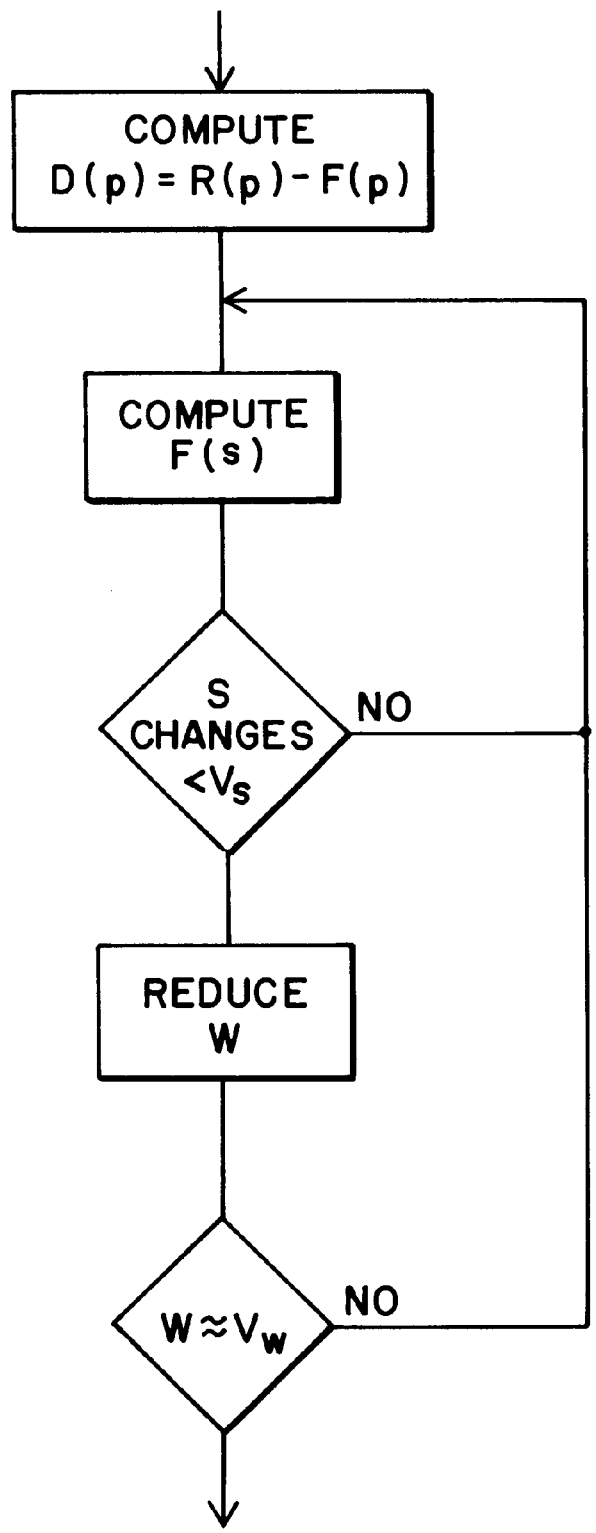
FIG. 7 is a flow diagram illustrating a third method of performing color mapping.

The LUT values for values between the control points can be found by known techniques of linear (or other) interpolation functions. Using the LUT, given pixel value for image (F) maps to a corrected value for the corrected image (F'). This method is illustrated in the flow diagram provided in FIG. 6.

Choosing many control points will yield a close match between the two image areas. This is appropriate when the image data are very similar. However, if the data have changed because of motion of parts of the image or because of the introduction or removal of image elements, fewer control points will generally produce a better result.

The second method is more complex than the first method described above. It has the advantage, however, that changes in contrast and flare can be accommodated as well. A disadvantage of the second method is that it can also give incorrect results in the presence of changes in the imagery between the input and reference images.

A third method for mapping one image to another is useful when the image data is basically similar, except for a color shift, between the reference area and the image area to be adjusted, but there are some image elements that have moved or are added or removed. The third method requires that the color=R(p)−F(p) for each pixel p in the regions to be compared.

2. Compute the quantity F(s) for a value w=largest code value in the image and s=0:

F(s)=(sum over p of D(p) exp(−(s−D(p))$^2$/w$^2$))/ (sum over p of exp(−(s−D(p))$^2$/w$^2$))

3. Set the value of s equal to F(s) and repeat step 2 until the value of s changes by less than a predetermined value (Vs), which is preferably the noise value in the image (or alternatively to a code value of one).

4. Reduce the value of w by half and repeat steps 2 and 3.

5. Keep repeating step 3 until the value of w is approximately a predetermined value (Vw), which is preferably the noise level in the image.

The resultant value of s is the color shift or correction factor to be added to the color band of image frame (F) so that it matches the reference image frame (R).

It will be appreciated from the foregoing description that what has been described is an efficient and effective method and apparatus for efficiently and automatically removing unwanted temporal lighting variations from a sequence of images.

The invention has been described with reference to certain preferred embodiments thereof. It will be understood, however, that modifications and variations can be effected by a person of ordinary skill in the art without departing from the scope of the appended claims. The invention, for example, is not limited to removing flicker in images digitized from motion picture film, but can be applied to digital images generated by and means or supplied from any source. For example, the invention may be utilized to correct temporal lighting variations in images incorporated in lenticular arrays.

What is claimed is:

1. A method of removing temporal light variations from a sequence of images comprising:

selecting a reference image and designating a portion of the reference image as a reference image region;

designating a first portion of at least one base image of the sequence of images as a first selected image region and a second portion as a second selected image region;

generating a color mapping by comparing the first selected image region of the base image with the reference image region of the reference image frame; and applying the color mapping to the second selected image region of the base image to generated a corrected image;

wherein generation of the color mapping includes:

generating a first histogram for at least one color band for the pixels in the reference image region of the reference image and a second histogram for at least one color band for the pixels in the first selected image region of the base image; and generating a lookup table based on the first and second histograms that maps original values of the pixels in the base image to corrected values in the corrected image.

2. A method of removing temporal light variations as claimed in claim 1, wherein the reference image is selected from the sequence of images.

3. A method of removing temporal light variations as claimed in claim 1, wherein the reference image region includes the entire reference image.

4. A method of removing temporal light variations as claimed in claim 1, wherein the first selected image region is selected from a location of the base image region that substantially corresponds to the location of the reference image region in the reference image.

5. An apparatus for removing temporal light variations from a sequence of images comprising:

means for selecting a reference image and designating a portion of the reference image as a reference image region;

means for designating a first portion of at least one base image of the sequence of images as a first selected image region and a second portion as a second selected image region;

means for generating a color mapping by comparing the selected image region of the base image with the reference image region of the reference image frame; and means for applying the color mapping to the second selected image region of the base image to generated a corrected image;

wherein the means for generating the color mapping includes:

means for generating a first histogram for at least one color band for the pixels in the reference image region of the reference image and a second histogram for at least one color band in the first selected image region of the base image; and means for generating a lookup table based on the first and second histograms that maps original values of the pixels in the base image to corrected values in the corrected image.

6. An apparatus for removing temporal light variations as claimed in claim 5, wherein the reference image is selected from the sequence of images.

7. An apparatus for removing temporal light variations as claimed in claim 5, wherein the reference image region includes the entire reference image.

8. An apparatus for removing temporal light variations as claimed in claim 5, wherein the first selected image region is selected from a location of the base image region that substantially corresponds to the location of the reference image region in the reference image.

* * * * *